(12) United States Patent
Kobayashi et al.

(10) Patent No.: US 9,309,380 B2
(45) Date of Patent: Apr. 12, 2016

(54) GLASS FIBER SIZING AGENT AND GLASS FIBER-REINFORCED CRYSTALLINE RESIN COMPOSITION

(75) Inventors: Kazushi Kobayashi, Saitama (JP); Nobuyuki Shimamura, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 13/979,482

(22) PCT Filed: Dec. 22, 2011

(86) PCT No.: PCT/JP2011/079792
§ 371 (c)(1), (2), (4) Date: Jul. 12, 2013

(87) PCT Pub. No.: WO2012/124236
PCT Pub. Date: Sep. 20, 2012

(65) Prior Publication Data
US 2013/0345343 A1 Dec. 26, 2013

(30) Foreign Application Priority Data
Mar. 17, 2011 (JP) ................ 2011-059163

(51) Int. Cl.
| | |
|---|---|
| *C03C 25/32* | (2006.01) |
| *C08L 23/04* | (2006.01) |
| *C08L 23/10* | (2006.01) |
| *C08K 5/46* | (2006.01) |
| *C08J 5/08* | (2006.01) |
| *C08K 5/3417* | (2006.01) |

(52) U.S. Cl.
CPC ............ *C08K 5/46* (2013.01); *C03C 25/326* (2013.01); *C08J 5/08* (2013.01); *C08K 5/3417* (2013.01); *C08L 23/04* (2013.01); *C08L 23/10* (2013.01)

(58) Field of Classification Search
CPC ........ C03C 25/326; C08K 5/46; C08L 23/04; C08L 23/06; C08L 23/08; C08L 23/10; C08L 23/12; C08L 23/14
See application file for complete search history.

(56) References Cited

U.S. PATENT DOCUMENTS

| | | | | |
|---|---|---|---|---|
| 3,193,520 | A | * | 7/1965 | Caldo .............................. 524/83 |
| 3,367,926 | A | * | 2/1968 | Voeks .............................. 524/84 |
| 4,305,864 | A | * | 12/1981 | Griffin et al. ................. 524/601 |
| 5,030,682 | A | | 7/1991 | Nomura et al. |
| 5,264,032 | A | | 11/1993 | Dietz et al. |
| 5,310,775 | A | * | 5/1994 | Sibilia et al. .................. 524/398 |
| 5,646,207 | A | * | 7/1997 | Schell ............................. 524/47 |
| 5,774,615 | A | | 6/1998 | Uda et al. |
| 6,664,357 | B1 | | 12/2003 | Edelman |
| 6,833,182 | B2 | * | 12/2004 | Audenaert et al. ......... 428/297.4 |
| 6,926,767 | B2 | * | 8/2005 | Chen ............................ 106/243 |
| 2010/0163417 | A1 | | 7/2010 | Chouai et al. |
| 2012/0101209 | A1 | * | 4/2012 | Khanna et al. ................ 524/445 |

FOREIGN PATENT DOCUMENTS

| | | |
|---|---|---|
| CN | 101665620 | 3/2010 |
| CN | 101962471 | 2/2011 |
| JP | 64-90238 | 4/1989 |
| JP | 10-87879 | 4/1998 |
| JP | 2000-072492 | 3/2000 |
| JP | 2009096849 A | 5/2009 |
| JP | 2010-275413 | 12/2010 |

OTHER PUBLICATIONS

Nabors (Alternative Sweeteners: Third Edition, Revised and Expanded: Saccharin IV. Properties. Marcel Decker, 2001, pp. 151-152).*
International Search Report, PCT/JP2011/079792, Feb. 21, 2012.
Supplementary European Search Report dated Sep. 17, 2014 in corresponding European Patent Application No. 11861163.1.
European Office Action dated Dec. 4, 2015; Application No. 11 861 163.1.

* cited by examiner

*Primary Examiner* — Brieann R Fink
(74) *Attorney, Agent, or Firm* — Young & Thompson

(57) ABSTRACT

Disclosed is a glass fiber-reinforced crystalline resin composition superior in the surface properties and the mechanical properties of a molded article thereof. Specifically, provided is a glass fiber-reinforced crystalline resin composition containing a glass fiber sizing agent that is an aqueous resin containing an o-sulfobenzimide compound, a crystalline resin, glass fibers, wherein the glass fibers have been treated with the glass fiber sizing agent. An aqueous polyurethane resin is preferred as the aqueous resin.

8 Claims, No Drawings

GLASS FIBER SIZING AGENT AND GLASS FIBER-REINFORCED CRYSTALLINE RESIN COMPOSITION

TECHNICAL FIELD

The present invention relates to a glass fiber sizing agent and a glass fiber-reinforced crystalline resin composition, and particularly to a glass fiber sizing agent containing an o-sulfobenzimide compound, and a glass fiber-reinforced crystalline resin composition containing glass fibers treated with the glass fiber sizing agent. The glass fiber-reinforced crystalline resin composition allows a molded article thereof to exhibit good surface properties including less surface roughness and less color unevenness and be superior in mechanical properties such as strength and rigidity.

BACKGROUND ART

Glass fiber-reinforced crystalline resin compositions obtainable by blending glass fibers with crystalline resins (crystalline synthetic resins) such as polyethylene, polypropylene, polybutene-1, polyethylene terephthalate, polybutylene terephthalate, polyphenylene sulfide, polyamide, and polystyrene are superior in strength and rigidity to unreinforced crystalline resins and have recently been expected for the expansion of their applications.

However, because of problems such as the affinity between such crystalline resins and glass fibers, the orientation of glass fibers, and so on, glass fiber-reinforced crystalline resin compositions have drawbacks such as that strength or rigidity is not increased sufficiently and that surface roughness is produced. The varying of the form of glass fibers or the type of a sizing agent can somewhat improve such drawbacks, but it does not show remarkable effects.

Patent Literature 1 indicated below has proposed to improve the surface properties and mechanical properties of a molded article by incorporating an aromatic phosphate metal salt, or the like into a resin composition containing a polyolefin, a polybutene-1, and glass fibers, but in the event that an aromatic phosphate metal salt is added as a nucleating agent directly to a crystalline resin, the effect thereof is still insufficient.

Moreover, Patent Literature 2 indicated below has proposed to improve the surface properties and mechanical properties of a molded article by incorporating an aromatic phosphate metal salt as a nucleating agent to a glass fiber sizing agent, but further improvement has been awaited.

CITATION LIST

Patent Literature

Patent Literature 1: JP 01-090238 A
Patent Literature 2: JP 10-087879 A

SUMMARY OF THE INVENTION

Technical Problem

Accordingly, an objective of the present invention is to provide a glass fiber-reinforced crystalline resin composition superior in the surface properties and the mechanical properties of a molded article thereof.

Solution to Problem

The present inventors studied earnestly and found that the above-described objective can be attained by reinforcing a crystalline resin with glass fibers treated with a sizing agent containing a compound with a specific structure completely different from the above-mentioned organic aromatic phosphate metal salts, which have conventionally been known to be used for glass fiber-reinforced crystalline resin compositions.

The present invention has been devised on the basis of the above finding and provides a glass fiber sizing agent that is an aqueous resin containing an o-sulfobenzimide compound.

In addition, the present invention provides a glass fiber-reinforced crystalline resin composition containing a crystalline resin and glass fibers, wherein the glass fibers have been treated with a glass fiber sizing agent.

Advantageous Effects of Invention

The use of glass fibers treated with the glass fiber sizing agent of the present invention can provide a glass fiber-reinforced crystalline resin composition superior in the surface properties and the mechanical properties such as strength of a molded article thereof. The glass fiber-reinforced crystalline resin composition of the present invention can be used particularly suitably for household electric appliances, OA instruments, automotive interior or exterior components, and so on.

DESCRIPTION OF EMBODIMENTS

Hereafter, the glass fiber sizing agent and the glass fiber-reinforced crystalline resin composition of the present invention are described in detail on the basis of their preferred embodiments.

First, description is made to the glass fiber sizing agent of the present invention.

The glass fiber sizing agent of the present invention contains an aqueous resin as a main ingredient. Aqueous resins that have been used for conventional glass fiber sizing agents can be used as the aqueous resin, and they may be of either self emulsification type or forced emulsification type. While examples of the aqueous resin include natural products such as starch and vegetable oil, and synthetic resins such as vinyl acetate-based resin, urethane-based resin, epoxy-based resin, polyester resin, and acrylic resin, the use of synthetic resin, especially aqueous polyurethane resin, is preferred because it affords a glass fiber-reinforced crystalline resin composition being good especially in physical properties or surface properties.

The aqueous polyurethane resin to be used suitably for the glass fiber sizing agent of the present invention can be produced by a well-known method. As to the method of dispersion in water of the aqueous polyurethane resin, there can be used any of a self emulsification type polyurethane resin in which an ionic group such as an anionic group and a cationic group, or a hydrophilic group such as a polyethylene glycol group has been introduced in a polyurethane skeleton to disperse in water, a forced emulsification type polyurethane resin using an emulsifying agent such as a surfactant, and a combination of self emulsification and forced emulsification. Moreover, a material polymerized with a chain extending agent may also be used.

More specifically, the aqueous polyurethane resin is a material obtained from a polyisocyanate component, a polyol component, an ionic group-introducing component, which is used as required, an ionic group-neutralizing agent component, which is used as required, an emulsifier component, which is used as required, and a chain extending agent component, which is used as required.

Examples of the polyisocyanate component include diisocyanate compounds and polyisocyanate compounds having three or more isocyanate groups in one molecule, and these may be used singly or in a combination of two or more of them.

Examples of the diisocyanate compound include aromatic diisocyanates such as 2,4- and/or 2,6-tolylene diisocyanate, diphenylmethane-4,4'-diisocyanate, 2,2'-dimethyldiphenylmethane-4,4'-diisocyanate, diphenyldimethylmethane-4,4'-diisocyanate, 2,5,2',5'-tetramethyl diphenylmethane-4,4'-diisocyanate, cyclohexylbis(4-isocyantriphenyl)methane, 3,3'-dimethoxydiphenylmethane-4,4'-diisocyanate, 4,4'-dimethoxydiphenylmethane-3,3'-diisocyanate, 4,4'-diethoxydiphenylmethane-3,3'-diisocyanate, 2,2'-dimethyl-5,5'-dimethoxydiphenylmethane-4,4'-diisocyanate, 3,3'-dichlorodiphenyldimethylmethane-4,4'-diisocyanate, benzophenone-3,3'-diisocyanate, p-phenylenediisocyanate, xylylene diisocyanate, 1,5-naphthylene diisocyanate, 3,3'-dimethyldiphenyl-4,4'-diisocyanate, dianisidine diisocyanate, tetramethylxylylene diisocyanate, biphenyl diisocyanate, 3,3'-dimethylbiphenyl diisocyanate, and 3,3'-dimethoxybiphenyl diisocyanate; alicyclic diisocyanates such as isophorone diisocyanate, dicyclohexylmethane-4,4'-diisocyanate, trans-1,4-cyclohexyl diisocyanate, and norbornane diisocyanate; and aliphatic diisocyanates such as methylene diisocyanate, dimethylene diisocyanate, trimethylene diisocyanate, tetramethylene diisocyanate, pentamethylene diisocyanate, hexamethylene diisocyanate, dipropyl ether diisocyanate, 2,2-dimethylpentane diisocyanate, 3-methoxyhexane diisocyanate, octamethylene diisocyanate, 2,2,4-trimethylpentane diisocyanate, nonamethylene diisocyanate, decamethylene diisocyanate, 3-butoxyhexane diisocyanate, 1,4-butylene glycol dipropyl ether diisocyanate, thiodihexyl diisocyanate, metaxylylene diisocyanate, paraxylylene diisocyanate, and tetramethylxylylene diisocyanate.

The diisocyanate compound may be used in the form of a modified body such as carbodiimide-modified, isocyanurate-modified, and biuret-modified, and also may be used in the form of a block isocyanate blocked with a certain blocking agent.

Examples of the polyisocyanate compound having three or more isocyanate group in one molecule include trifunctional or more isocyanate compounds such as 1-methylbenzene-2,4,6-triisocyanate, 1,3,5-trimethylbenzene-2,4,6-triisocyanate, 1,3,7-naphthalene triisocyanate, biphenyl-2,4,4'-triisocyanate, diphenylmethane-2,4,4'-triisocyanate, 3-methyldiphenylmethane-4,6,4'-triisocyanate, triphenylmethane-4,4',4"-triisocyanate, 1,6,11-undecane triisocyanate, 1,8-diisocyanate-4-isocyanatemethyloctane, 1,3,6-hexamethylene triisocyanate, bicycloheptane triisocyanate, tris(isocyanatephenyl)thiophosphate, and dimethyltriphenylmethane tetraisocyanate, and isocyanurate trimers, biuret trimers, and trimethylolpropane adducts of the diisocyanate compounds provided above as examples; these isocyanate compounds may be used in the form of a modified body such as carbodiimide-modified, isocyanurate-modified, and biuret-modified, and also may be used in the form of a block isocyanate blocked with a certain blocking agent.

Among these, hexamethylene diisocyanate, isophorone diisocyanate, and dicyclohexylmethane diisocyanate are preferred as the polyisocyanate component from the viewpoint of yellowing resistance, easy availability, and easiness of production.

The polyisocyanate component is used preferably in 0.8 to 3 equivalents, more preferably in 1 to 2 equivalents based on the combined amount of a polyol component described below, and an ionic group-introducing component and active hydrogens of a chain extending agent to be used as required. If the usage amount of the polyisocyanate component is less than 0.8 equivalents, then excess polyol and so on will remain, whereas if more than 3 equivalents, then many urea bonds will be formed when water is added. In both cases, properties may be deteriorated.

Examples of the polyol component include diol compounds and triol compounds, and these may be used singly or in an admixture of two or more of them.

Examples of the diol compound and the triol compound include low molecular weight polyols, polyether polyols, polyester polyols, polycarbonate polyols, crystalline or non-crystalline polycarbonate polyols, polybutadiene polyol, and silicone polyol, and among these, polyether polyols, polyester polyols, and polycarbonate polyols can use suitably.

Examples of the low molecular weight polyol include aliphatic diols, such as ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, and 1,10-decanediol, alicyclic diols, such as cyclohexanedimethanol and cyclohexanediol, and trihydric or higher polyols, such as trimethylolethane, trimethylolpropane, hexitols, pentitols, glycerol, polyglycerol, pentaerythritol, dipentaerythritol, tetramethylolpropane.

Examples of the polyether polyol include ethylene oxide adducts, such as diethylene glycol and triethylene glycol; propylene oxide adducts, such as dipropylene glycol and tripropylene glycol; ethylene oxide and/or propylene oxide adducts of the low molecular weight polyols described above, and polytetramethylene ether glycol. The number average molecular weight of the polyether polyol is preferably 500 to 7000, and more preferably 1000 to 5000.

The polyester polyols include a polyester polyol obtained by direct esterification and/or transesterification of a polyol such as the low molecular weight polyols provided above as examples with a polycarboxylic acid or its ester-forming derivative such as ester, anhydride, and halide and/or a lactone or a hydroxycarboxylic acid obtained by ring-opening hydrolysis of the lactone in an amount less than the stoichiometric amount of the polyol. Examples of the polycarboxylic acid includes aliphatic dicarboxylic acids such as oxalic acid, malonic acid, succinic acid, glutaric acid, adipic acid, pimeric acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, hydrogenated dimer acid, and dimer acid; aromatic dicarboxylic acids such as phthalic acid, terephthalic acid, isophthalic acid, and naphthalenedicarboxylic acid; alicyclic dicarboxylic acids such as cyclohexanedicarboxylic acid; tricarboxylic acids such as trimellitic acid, trimesic acid, and trimer of castor oil fatty acid; and tetracarboxylic acids such as pyromellitic acid. Examples of the ester-forming derivatives include anhydrides of the polycarboxylic acids; halides such as chlorides and bromides of the polycarboxylic acids, lower aliphatic esters such as methyl, ethyl, propyl, isopropyl, butyl, isobutyl, and amyl esters of the polycarboxylic acids. Examples of the lactones include lactones such as γ-caprolactone, δ-caprolactone, ε-caprolactone, dimethyl-ε-caprolactone, δ-valerolactone, γ-valerolactone, and γ-butyrolactone. The number average molecular weight of the polyester polyol is preferably 500 to 7000, and more preferably 1000 to 5000.

Examples of the polycarbonate polyols include reaction products of diols, such as 1,3-propanediol, 1,4-butanediol, 1,6-hexanediol, diethylene glycol, polypropylene glycol, and polytetramethylene glycol, with phosgene, diallyl carbonate (e.g., diphenyl carbonate), or cyclic carbonate (e.g., propylene carbonate). The number average molecular weight of the polycarbonate polyol is preferably 500 to 7000, and more preferably 1000 to 5000.

Examples of the ionic group-introducing component include substances capable of introducing an anionic group and substances capable of introducing a cationic group. Examples of the substances capable of introducing an anionic group include polyols containing a carboxyl group, such as dimethylolpropionic acid, dimethylolbutanoic acid, dimethylolbutyric acid, and dimethylolvaleric acid, and polyols containing a sulfonic acid group, such as 1,4-butanediol-2-sulfonic acid, and examples of the substance capable of introducing a cationic group include N,N-dialkylalkanolamines, N-alkyl-N,N-dialkanolamines, such as N-methyl-N, N-diethanolamine, and N-butyl-N,N-diethanolamine, and trialkanolamines.

Although the amount of the ionic group-introducing component to be used depends on the types of the polyol component and the polyisocyanate component to be used and the relationship with the use of an emulsifier, in a self-emulsification system using an ionic group-introducing component, it is usually used preferably in 0.5 to 50% by weight, more preferably 1 to 30% by mass in all the reaction components to constitute an aqueous polyurethane resin. If less than 0.5% by mass, storage stability may be poor, and if it is used in an amount more that 50% by mass, it may have a bad influence on the dispersibility in water of a urethane prepolymer or the physical properties of a urethane coating film.

As far as the ionic group neutralizer component is concerned, examples of anionic group neutralizers include tertiary amine compounds such as trialkylamines, such as trimethylamine, triethylamine, and tributylamine, N,N-dialkylalkanolamines, such as N,N-dimethylethanolamine, N,N-dimethyl propanolamine, N,N-dipropylethanolamine, and 1-dimethylamino-2-methyl-2-propanol, N-alkyl-N,N-dialkanolamines, and trialkanolamines, such as triethanolamine; and basic compounds, such as ammonia, trimethylammonium hydroxide, sodium hydroxide, potassium hydroxide, and lithium hydroxide, and examples of cationic group neutralizers include organic carboxylic acids, such as formic acid, acetic acid, lactic acid, succinic acid, glutaric acid, and citric acid; organosulfonic acids, such as paratoluene sulfonic acid and alkyl sulfonates; inorganic acids, such as hydrochloric acid, phosphoric acid, nitric acid, and sulfonic acid; epoxy compounds, such as epihalohydrin, and quaternizing agents, such as dialkyl sulfates and alkyl halides. The amount of such a neutralizing agent to be used is preferably 0.5 to 2.0 mol, more preferably 0.8 to 1.5 mol per mol of ionic groups because if the amount is excessively small or large, there usually is a fear that physical properties such as water resistance, strength, and elongation of a coating film obtained from an aqueous polyurethane resin deteriorate.

Examples of the emulsifier component include anionic surfactants such as fatty acid salts, sulfate ester salts of higher alcohols, sulfate esters of liquid fatty oils, sulfate salts of aliphatic amines and aliphatic amides, phosphate esters of aliphatic alcohols, sulfonate salts of dibasic fatty acid esters, sulfonate salts of aliphatic amides, alkyl allyl sulfonate salts, and formalin-condensed naphthalenesulfonate salts, cationic surfactants such as primary amine salts, secondary amine salts, tertiary amine salts, quaternary amine salts, and pyridinium salts, amphoteric surfactants such as betaine type, sulfate type, and sulfonic acid type, and nonionic surfactants.

There can be used as a chain extending agent component a single kind or two or more kinds of commonly known chain extending agents which have been used conventionally for aqueous polyurethane resin compositions. Polyamine compounds and polyhydric primary alcohol compounds are preferred, and polyamine compounds are more preferred.

Examples of the polyamine compounds include low molecular weight diamine compounds resulting from the substitution of an alcoholic hydroxy group in the low molecular weight polyols provided as examples with an amino group, such as ethylenediamine and propylenediamine; polyetherdiamines, such as polyoxypropylenediamine and polyoxyethylenediamine; alicyclic diamines, such as menthenediamine, isophoronediamine, norbornenediamine, bis(4-amino-3-methyldicyclohexyl)methane, diaminodicyclohexylmethane, bis(aminomethyl)cyclohexane, and 3,9-bis(3-aminopropyl)2,4,8,10-tetraoxaspiro(5,5) undecane; aromatic diamines, such as m-xylenediamine, α-(m/p-aminophenyl)ethylamine, m-phenylenediamine, diaminodiphenylmethane, diaminodiphenylsulfone, diaminodiethyldimethyldiphenylmethane, diaminodiethyldiphenylmethane, dimethylthiotoluenediamine, diethyltoluenediamine, α,α'-bis(4-aminophenyl)-p-diisopropylbenzene; hydrazine; and dicarboxylic acid dihydrazide compounds, which are compounds formed of hydrazine and dicarboxylic acids provided as examples of the polycarboxylic acid to be used for the above-described polyester polyols.

The chain extending agent is not particularly limited in the usage amount thereof and may be used in an arbitrarily chosen amount; for example, when a prepolymer method is chosen as a method for producing an aqueous polyurethane resin, the range of 0.1 to 1.5 of the number of active hydrogens of the chain extending agent relative to 1 as the number of the isocyanate groups in a prepolymer is preferred because the dispersibility of a resulting aqueous polyurethane resin is good, and the range of 0.5 to 1.0 is more preferred.

For the aqueous polyurethane resin may be used as required a common crosslinking agent capable of imparting a crosslinked structure to a polyurethane molecule. Examples of crosslinking agents suitable for an aqueous polyurethane resin include melamine, monomethylolmelamine, dimethylolmelamine, trimethylolmelamine, tetramethylolmelamine, pentamethylolmelamine, hexamethylolmelamine, methylated methylolmelamine, butylated methylolmelamine, and melamine resin, and among these, particularly preferable is melamine, which is inexpensive and can affords a polyurethane with good dispersibility.

In the production of the aqueous polyurethane resin, a solvent inactive to reaction may be used as required. Examples of such a solvent include acetone, methyl ethyl ketone, dioxane, tetrahydrofuran, and N-methyl-2-pyrrolidone, and such a solvent is used usually in an amount of 3 to 100% by mass based on the total amount of the above-described raw materials to be used for the production of a prepolymer. Among such solvents, a solvent having a boiling point of 100° C. or lower is preferably evaporated under reduced pressure after dispersing a urethane prepolymer in water.

In the aqueous polyurethane resin, the ratio of the number of NCO/the number of OH, which is the ratio of the number of the isocyanate groups of the polyisocyanate component to be used to the number of the alcoholic hydroxyl groups of the polyol component, is preferably within the range of from 1.0 to 5.0, more preferably from 1.05 to 3.0. In order to cause the above-mentioned ionic group-introducing component used as required to react, the urethane prepolymer formed of the isocyanate component and the polyol component preferably has a terminal isocyanate group. A ratio of the number of NCO/the number of OH being less than 1.0 is undesirable because it affords a urethane prepolymer having a terminal hydroxyl group. A ratio larger than 5.0 is undesirable because it may have an influence on the storage stability of an aqueous polyurethane resin.

As described above, it is well known that an aqueous polyurethane resin is produced from these raw materials, and it is also possible to feed these raw materials in an appropriately changed order or feed them in separated portions.

The water-based polyurethane resin obtained in such a way is usually adjusted to have a resin solid content of 1 to 90% by mass, preferably 5 to 80% by mass.

Of course, it is also possible to use a commercially available water-based polyurethane resin as received, and there can be used, for example, the "ADEKA BONTIGHTER" series produced by ADEKA, the "OLESTER" series produced by Mitsui Toatsu Chemicals, Inc., the "VONDIC" series and the "HYDRAN" series produced by Dainippon Ink and Chemicals Corporation, the "Impranil" series produced by Bayer, the "Soflanate" series produced by Nippon Soflan, the "Poiz" series produced by Kao Corporation, the "Sanprene" series produced by Sanyo Chemical Industries, Ltd., the "Izelax" series produced by Hodogaya Chemical Co., Ltd., the "Superflex" series produced by Dai-Ichi Kogyo Seiyaku Co., Ltd., and the "NeoRez" series produced by Zeneca Resins.

The glass fiber sizing agent of the present invention is a material prepared by including an o-sulfobenzimide compound in the aqueous resin. Examples of the o-sulfobenzimide compound include o-sulfobenzimide, salts of o-sulfobenzimide, halides of o-sulfobenzimide, and o-sulfobenzimide derivatives, and specifically include o-sulfobenzimide, sodium o-sulfobenzimide, potassium o-sulfobenzimide, calcium o-sulfobenzimide, thio-o-sulfobenzimide, N-methyl-o-sulfobenzimide, o-sulfobenzimidemethyl ether, N-propoxymethoxy-o-sulfobenzimide, N-propyl-o-sulfobenzimide, N-(hydroxymethyl)-o-sulfobenzimide, N-(2-nitrophenylthio) o-sulfobenzimide, N-bromo-o-sulfobenzimide, N-iodo-o-sulfobenzimide, N-chloro-o-sulfobenzimide, acetyl-o-sulfobenzimide, butyryl-o-sulfobenzimide, hexanoyl-o-sulfobenzimide, octanoyl-o-sulfobenzimide, decanoyl-o-sulfobenzimide, lauroyl-o-sulfobenzimide, myristoyl-o-sulfobenzimide, palmitoyl-o-sulfobenzimide, stearoyl-o-sulfobenzimide, cinnamoyl-o-sulfobenzimide, 3,4-dimethoxycinnamoyl-o-sulfobenzimide, 3,4,5-trimethoxycinnamoyl-o-sulfobenzimide, and N-vinyl-o-sulfobenzimide.

The o-sulfobenzimide compound to be used for the glass fiber sizing agent of the present invention is preferably a compound represented by general formula (1) given below. The o-sulfobenzimide compound may contain a hydrate.

[Chemical Formula 1]

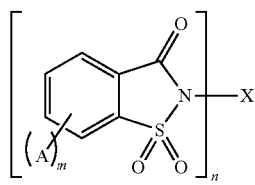

general formula (1)

wherein A represents a halogen atom, an alkyl group having 1 to 8 carbon atoms that may have a substituent, an alkoxy group having 1 to 8 carbon atoms that may have a substituent, an alkylthio group having 1 to 5 carbon atoms, a nitro group, or a cyano group, with the proviso that when there are two or more As, they may be either identical or different, m represents an integer of 0 to 4, X represents a metal atom, and n is an integer that is 1 to 4 and corresponds to the valence number of the metal atom represented by X.

Examples of the halogen atom represented by A in the general formula (1) include fluorine, chlorine, bromine, and iodine.

Examples of the alkyl group having 1 to 8 carbon atoms that may have a substituent represented by A in the general formula (1) include methyl, ethyl, propyl, isopropyl, butyl, second butyl, tertiary butyl, isobutyl, amyl, isoamyl, tertiary amyl, hexyl, cyclohexyl, heptyl, isoheptyl, tertiary heptyl, n-octyl, isooctyl, tertiary octyl, 2-ethylhexyl, and trifluoromethyl, and hydrogen atoms in these groups may have been substituted with, for example, halogen atoms.

Examples of the alkoxy group having 1 to 8 carbon atoms that may have a substituent represented by A in the general formula (1) include methoxy, ethoxy, propoxy, isopropoxy, butoxy, secondary butoxy, tertiary butoxy, and trifluoromethyloxy, and hydrogen atoms in these groups may have been substituted with, for example, halogen atoms.

A in the general formula (1) may be an alkylthio group having 1 to 5 carbon atoms such as methylthio, ethylthio, propylthio, isopropylthio, and tertiary butylthio, a nitro group, or a cyano group besides the alkyl group and the alkoxy group.

Examples of the metal atom represented by X in the general formula (1) include metal atoms such as lithium, potassium, sodium, magnesium, calcium, strontium, barium, titanium, manganese, iron, zinc, silicon, zirconium, yttrium, or barium. Among these, potassium, lithium, and sodium are preferable because of their effect of accelerating the crystallization of a polyester resin, and sodium is particularly preferred.

More specific examples of the o-sulfobenzimide compound represented by the general formula (1) include the compounds represented by the following compound No. 1 to No. 5, but the present invention is not limited by these compounds.

[Chemical Formula 2]

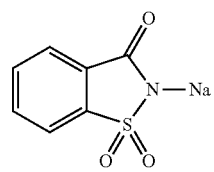

compound No. 1

[Chemical Formula 3]

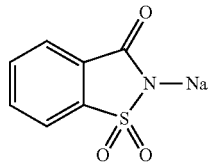

compound No. 2

[Chemical Formula 4]

-continued

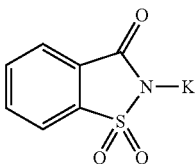

compound No. 3

[Chemical Formula 5]

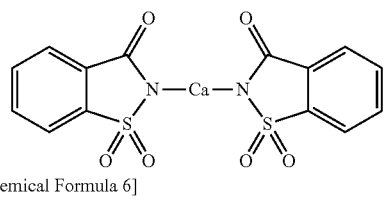

compound No. 4

[Chemical Formula 6]

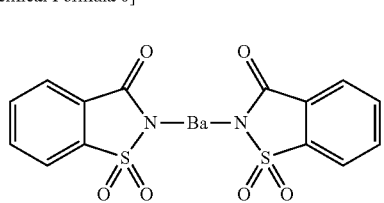

compound No. 5

In the glass fiber sizing agent of the present invention, the content of the o-sulfobenzimide compound is preferably 0.5 to 20 parts by mass, more preferably 1 to 10 parts by mass relative to 100 parts by weight of the aqueous resin. If the content is less than 0.5 parts by mass, then the effect of improving physical properties may not be achieved sufficiently, and even if the content exceeds 20 parts by mass, improvement in effects is not expected and rather bad influence is given to the function of the sizing agent. The "100 parts by mass of the aqueous resin" to be used as the base of the content is the amount as the resin solid of the aqueous resin (the same is applied hereinafter).

In the glass fiber sizing agent of the present invention, compounding agents usually used for sizing agents, such as a surface treatment agent, a friction reducer, a lubricant, an antistatic agent, a pH adjuster, and water may be incorporated together with the o-sulfobenzimide compound. The content of these arbitrary agents in the glass fiber sizing agent of the present invention (in terms of the content of solid resulting from the removal of water and the like) is preferably adjusted to 50 parts by mass or less in total based on 100 parts by mass of the aqueous resin from the viewpoint of preventing the effect of the present invention from being impaired.

Examples of the surface treatment agent include coupling agents such as aminosilane-based agents, epoxysilane-based agents, vinylsilane-based agents, methacrylosilane-based agents, ureidosilane-based agents, boran-based agents, titanate-based agents, aluminum-based agents, chromium-based agents, and zirconium-based agents; and colloidal gel such as colloidal silica and colloidal alumina.

Examples of the friction reducer include hydrogenated cured animal or vegetable oils, paraffin wax, and ester-type synthetic oils.

Examples of the lubricant (or feeling modifier) include butyl stearate, tetraethylenepentamine distearate, hydrogenated castor oil, imidazoline-based fatty acid amides, cationic fatty acid amides, cationic polyethyleneimine polyamide, and bisphenol A poly(oxyethylene) ether glycol.

Examples of the antistatic agent include various surfactants such as anionic surfactants, cation surfactants, and nonionic surfactants.

Examples of the pH adjuster include ammonia and acetic acid.

The method and the time of including the o-sulfobenzimide compound in the aqueous resin are not particularly limited; for example, there can be used a method in which in the production of an aqueous resin such as an aqueous polyurethane resin, it is incorporated beforehand together with the raw materials of the aqueous resin; and a method in which after the production of an aqueous resin, it is mixed with the aqueous resin and other agents to be used as required. Moreover, it is also permitted that the glass fiber sizing agent of the present invention is constituted of a treating liquid containing the aqueous resin and a treating liquid containing the o-sulfobenzimide compound prepared separately from the aforementioned treating liquid, then glass fibers are treated with these treating liquids in multiple separate stages, and thereby the aqueous resin and the o-sulfobenzimide compound are combined on a glass surface. Specifically, the aqueous resin and the o-sulfobenzimide compound may be used so that the aqueous resin and the o-sulfobenzimide compound may be eventually present on the surface of glass fiber.

Other agents to be used as required may be included in the aqueous resin in the same manner as the above-described o-sulfobenzimide compound.

In treating glass fibers with the glass fiber sizing agent of the present invention, the treatment is carried out preferably so that the amount of the glass fiber sizing agent of the present invention expressed in the amount of residual solid may become 0.05 to 10 parts by mass, more preferably 0.1 to 5 parts by mass per 100 parts by weight of the glass fibers. If the treatment amount of the glass fiber sizing agent of the present invention is less than 0.05 parts by mass, then the function as a sizing agent may be insufficient, and even if the treatment amount exceeds 10 parts by mass, then further improvement of the effect of the present invention is not expected and rather a bad influence may be given on physical properties.

The glass fibers to be treated with the glass fiber sizing agent of the present invention have no particular limitations and the raw material thereof may be any of alkali glass, low-alkali glass, and alkali-free glass. Methods of producing glass fiber may include, but are not particularly limited to, a roving method, a chopped strand method, and a milled fiber method.

While the form of the glass fibers is not particularly limited, the use of glass fibers having a fiber length of 0.5 to 10 mm and a fiber diameter of 1 to 50 μm, especially a fiber length of 1 to 5 mm and a fiber diameter of 2 to 20 μm is preferable because it can afford products particularly superior in physical properties or surface properties.

As the method of treating the glass fibers with the glass fiber sizing agent of the present invention, conventional methods, such as dip coating, roller coating, blast coating, flow coating, and spray coating, may be used arbitrarily.

Next, the glass fiber-reinforced crystalline resin composition of the present invention is described in detail.

The glass fiber-reinforced crystalline resin composition of the present invention is a glass fiber-reinforced crystalline resin composition containing a crystalline resin and glass fibers wherein the glass fibers have been treated with a glass fiber sizing agent of the present invention.

Although the glass fiber-reinforced crystalline resin composition of the present invention contains a crystalline resin and glass fibers treated with the glass fiber sizing agent in arbitrary amounts according to the intended purpose, it preferably contains 95 to 50% by mass, especially 90 to 60% by mass of a crystalline resin and 1 to 50% by mass, especially 5 to 40% by mass of glass fibers treated with the glass fiber sizing agent of the present invention. If the crystalline resin is less than 50% by mass, a molded article may be fragile or surface properties may deteriorate, and conversely if the glass fibers are less than 1% by mass, sufficient improvement in mechanical properties may not be attained.

Examples of the crystalline resin include crystalline synthetic resins such as polyolefin resins; polyester resins; polyphenylene sulfide resins; linear polyamide resins such as polycaprolactone and polyhexamethylene adipamide; polystyrene polymers such as syndiotactic polystyrene, poly(alkylstyrene), poly(halogenated styrene), poly(alkoxystyrene), poly(vinyl benzoate), and copolymers thereof, and in particular, the use of a polyolefin resin or a polyester resin is preferable because it affords molded articles particularly superior in mechanical properties. In order to improve affinity with glass fibers, these crystalline resins may be modified with an unsaturated carboxylic acid and/or a derivative thereof, chlorine, vinyl silane, etc.

Examples of the above-mentioned polyolefin resins include α-olefin polymers such as low density polyethylene, linear low density polyethylene, high density polyethylene, isotactic polypropylene, syndiotactic polypropylene, hemi-isotactic polypropylene, cycloolefin polymers, stereoblock polypropylene, poly-3-methyl-1-butene, poly-3-methyl-1-pentene, and poly-4-methyl-1-pentene, and α-olefin copolymers such as ethylene/propylene block or random copolymers.

Examples of the above-mentioned polyester resins include aromatic polyesters including polyalkylene terephthalate or polyalkylene naphthalate such as polyethylene terephthalate, polybutylene terephthalate, polycyclohexanedimethylene terephthalate, polyethylene naphthalate, polybutylene naphthalate; polyether ester resins; decomposable aliphatic polyesters such as polyhydroxybutyrate, polycaprolactone, polybutylene succinate, polyethylene succinate, polylactic acid resin, polymalic acid, polyglycolic acid, and polydioxanone, and poly(2-oxetanone); aromatic polyester/polyether block copolymers, aromatic polyester/polylactone block copolymers, and polyarylate, and among these polyethylene terephthalate and/or polybutylene terephthalate are used preferably because they are good in transparency.

As required, the oxidation stability and the light stability of the glass fiber-reinforced crystalline resin composition of the present invention can be improved by the addition thereto of a phenolic antioxidant, an organophosphorus antioxidant, a thioether antioxidant, an ultraviolet absorber or a light stabilizer such as a hindered amine compound.

Examples of the phenolic antioxidant include 2,6-di-tert-butyl-p-cresol, 2,6-diphenyl-4-octadecyloxyphenol, stearyl (3,5-di-tert-butyl-4-hydroxyphenyl)propionate, distearyl(3,5-di-tert-butyl-4-hydroxybenzyl)phosphonate, tridecyl 3,5-di-tert-butyl-4-hydroxybenzyl thio acetate, thiodiethylenebis[(3,5-di-tert-butyl-4-hydroxyphenyl)propionate], 4,4'-thiobis(6-tert-butyl-m-cresol), 2-octylthio-4,6-di(3,5-di tert-butyl-4-hydroxyphenoxy)-s-triazine, 2,2'-methylenebis(4-methyl-6-tert-butylphenol), bis[3,3-bis(4-hydroxy-3-tert-butylphenyl)butyric acid]glycol ester, 4,4'-butylidenebis(2,6-di-tert-butylphenol), 4,4'-butylidenebis(6-tert-butyl-3-methylphenol), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3',5'-di-tert-butyl-4'-hydroxyphenyl)propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane], and triethylene glycol bis[β-(3-tert-butyl-4-hydroxy-5-methylphenyl)propionate].

Examples of the above-mentioned organophosphorus antioxidant include triphenyl phosphite, tris(2,4-di-tert-butylphenyl)phosphite, tris(2,5-di-tert-butylphenyl)phosphite, tris(nonylphenyl)phosphite, tris(dinonylphenyl)phosphite, tris(mono-, di-mixed nonylphenyl)phosphite, diphenyl acid phosphite, 2,2'-methylenebis(4,6-di-tert-butylphenyl)octyl phosphite, diphenyldecyl phosphite, diphenyloctyl phosphite, di(nonylphenyl)pentaerythritol diphosphite, phenyl-diisodecyl phosphite, tributyl phosphite, tris(2-ethylhexyl) phosphite, tridecyl phosphite, trilauryl phosphite, dibutyl acid phosphite, dilauryl acid phosphite, trilauryl trithiophosphite, bis(neopentyl glycol)-1,4-cyclohexanedimethyl diphosphite, bis(2,4-di-tert-butylphenyl)pentaerythritol diphosphite, bis(2,5-di-tert-butylphenyl)pentaerythritol diphosphite, bis(2,6-di-tert-butyl-4-methylphenyl)pentaerythritol diphosphite, bis(2,4-dicumylphenyl)pentaerythritol diphosphite, distearyl pentaerythritol diphosphite, tetra (C12-15 mixed alkyl)-4,4'-isopropylidene diphenyl phosphite, bis[2,2'-methylenebis(4,6-diamylphenyl)]-isopropylidene diphenyl phosphite, tetratridecyl-4,4'-butylidenebis(2-tert-butyl-5-methylphenol)diphosphite, hexa(tridecyl)-1,1,3-tris(2-methyl-5-tert-butyl-4-hydroxyphenyl)butane-triphosphite, tetrakis(2,4-di-tert-butylphenyl) biphenylene diphosphonite, tris(2-[(2,4,7,9-tetrakis-tert-butyldibenzo[d,f][1,3,2]dioxaphosphepin-6-yl)oxy]ethyl) amine, 9,10-dihydro-9-oxa-10-phosphaphenanthrene-10-oxide, and 2-butyl-2-ethylpropanediol-2,4,6-tri-tert-butylphenol monophosphite.

Examples of the thioether antioxidant include dialkyl thiodipropionates such as dilauryl-, dimyristyl-, myristyl stearyl-, or distearyl ester of thiodipropionic acid and β-alkylmercaptopropionate esters of polyol such as pentaerythritol tetra(β-dodecylmercaptopropionate).

Examples of the ultraviolet absorber include 2-hydroxybenzophenones such as 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone); 2-(2-hydroxyphenyl) benzotriazoles such as 2-(2-hydroxy-5-methylphenyl) benzotriazole, 2-(2-hydroxy-5-tert-octylphenyl) benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis(4-tert-octyl-6-benzotriazolylphenol), polyethylene glycol ester of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl] benzotriazole, and 2-[2-hydroxy-4-(3- methacryloyloxypropyl)phenyl]benzotriazole; 2-(2-hydroxyphenyl)-4,6-diaryl-1,3,5-triazines such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-C12-C13 mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine, and 2,4,6-tris(2-hydroxy-3-methyl-4-hexyloxyphenyl)-1,3,5-triazine; benzoates such as phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy) benzoate, tetradecyl(3,5-di-tert-butyl-4-hydroxy)benzoate, hexadecyl(3,5-di-tert-butyl-4-hydroxy)benzoate, octadecyl (3,5-di-tert-butyl-4-hydroxy)benzoate, and behenyl(3,5-di-tert-butyl-4-hydroxy)benzoate; substituted oxanilides such as 2-ethyl-2'-ethoxyoxanilide and 2-ethoxy-4'-dodecyloxanilide; cyanoacrylates such as ethyl-α-cyano-β,β-diphenylacrylate and methyl-2-cyano-3-methyl-3-(p-methoxyphenyl)acrylate; and various metal salts or metal chelates, especially salts or chelates of nickel or chromium.

Examples of the light stabilizer such as a hindered amine compound include 1,2,2,6,6-pentamethyl-4-piperidyl stearate, bis(1,2,2,6,6-pentamethyl-4-piperidyl)sebacate, bis(1-octoxy-2,2,6,6-tetramethyl-4-piperidyl)sebacate, 1,2,2,6,6-pentamethyl-4-piperidyl methacrylate, 2,2,6,6-tetramethylpiperidyl methacrylate, tetrakis(1,2,2,6,6-pentamethyl-4-piperidyl)-1,2,3,4-butanetetracarboxylate, bis(1,2,2,6,6-pentamethyl-4-piperidyl).bis(tridecyl)-1,2,3,4-butanetetracarboxylate, bis(1,2,2,6,6-pentamethyl-4-piperidyl)-2-butyl-2-(3,5-di-tert-butyl-4-hydroxybenzyl) malonate, 3,9-bis[1,1-dimethyl-2-{tris(1,2,2,6,6-pentamethyl-4-piperidyloxycarbonyloxy) butylcarbonyloxy}ethyl]-2,4,8,10-tetraoxaspiro[5.5] undecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(1,2,2,6,6-pentamethyl-4-piperidyl)amino)-s-triazin-6-ylamino] undecane, 1-(2-hydroxyethyl)-1,2,2,6,6-pentamethyl-4-piperidinol/diethyl succinate polycondensate, 1,6-bis(1,2,2,6,6-pentamethyl-4-piperidylamino)hexane/dibromoethane polycondensate, bis{4-(1-octyloxy-2,2,6,6-tetramethyl) piperidyl}decanedionate, bis{4-(2,2,6,6-tetramethyl-1-undecyloxy)piperidyl)carbonate, and TINUVIN NOR 371 produced by Ciba Specialty Chemicals.

Moreover, into the glass fiber-reinforced crystalline resin composition of the present invention may be incorporated a nucleating agent, and examples of the nucleating agent include metal salts of organic carboxylic acids such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluate, sodium salicylate, potassium salicylate, zinc salicylate, aluminum dibenzoate, aluminum p-tert-butylbenzoate, potassium dibenzoate, lithium dibenzoate, sodium β-naphthalate, sodium cyclohexanecarboxylate, and disodium bicyclo[2.2.1]heptane-2,3-dicarboxylate, salts of organic sulfonic acids, such as sodium p-toluenesulfonate and sodium sulfoisophthalate, carboxylic amides such as stearamide, ethylenebislauramide, palmitamide, hydroxystearamide, erucamide, and trimesic acid tris(tert-butyramide), benzylidenesorbitol and benzylidenesorbitol derivatives such as bis(p-methylbenzylidene)sorbitol and bis (p-ethylbenzylidene)sorbitol, metal salts of phosphorus compounds such as sodium 2,2'-methylenebis(4,6-di-tert-butylphenyl)phosphate, and 2,2-methylbis(4,6-di-tert-butylphenyl)sodium.

In the glass fiber-reinforced crystalline resin composition of the present invention, in addition to the above-mentioned o-sulfobenzimide compound used for the glass fiber sizing agent of the present invention, the above-mentioned o-sulfobenzimide compound may be further incorporated as a third ingredient directly into the glass fiber-reinforced crystalline resin composition of the present invention.

Besides, to the glass fiber-reinforced crystalline resin composition of the present invention may be added as required antistatic agents such as nonionic antistatic agents, cationic antistatic agents, or an anionic antistatic agents, hydrotalcites, alkaline earth metal salts of aliphatic carboxylic acids, pigments, dyes, fillers, foaming agents, flame retardants, lubricants, processing aids, and so on.

The glass fiber-reinforced crystalline resin composition of the present invention can be used as various molded articles produced by well-known processing methods such as extrusion forming, injection molding, vacuum forming, blow molding, calendering, rotational molding, and crosslinking expansion molding, and it can be used particularly suitably for household electric appliances, OA instruments, and automotive interior or exterior components, for example.

EXAMPLES

The present invention will be described in more detail with reference to Examples and Comparative Examples. However, the present invention is not limited by the Examples.

Example 1 and Comparative Example 1

A prepolymer was produced by reacting 139 parts by mass of polycarbonate diol of 1,6-hexanediol (average molecular weight 2000), 13 parts by mass of 1,4-butanediol, 13 parts by mass of dimethylol propionic acid, and 85 parts by mass of isophorone diisocyanate in methyl ethyl ketone.

Then, 300 parts by mass of water, 10.8 parts by mass of triethylamine, 3.0 parts by mass of ethylenediamine, and 12.5 parts by mass of a test compound (see [Table 1] given below) were added, and were further reacted. Then, methyl ethyl ketone was removed by evaporation, thereby producing a glass fiber sizing agent contain an aqueous polyurethane resin as a main ingredient.

Glass fibers a to d being 13 µm in diameter and 3 mm in length were produced by a chopped strand method using the resulting glass fiber sizing agents. At this time, the amount of a sizing agent attached to glass fibers, expressed in residual solid content, was 1 part by mass based on 100 parts by mass of the glass fibers.

Glass fibers a and b are products obtained by using compounds No. 1 and No. 2, which are o-sulfobenzimide compounds, as test compounds, respectively. Glass fiber c is a product obtained by using no test compound, and glass fiber d is a product obtained by using comparative compound-1 as a test compound.

A glass fiber-reinforced crystalline resin composition (maleated polypropylene resin composition) was formulated by the following formulation and kneaded with a twin screw extruder at 270° C., and then a pellet was prepared with a pelletizer. A specimen was produced from this pellet by an injection molding method at a molding temperature of 270° C. and a mold temperature of 80° C.

Using this specimen, tensile strength (ISO 527-1), flexural strength (ISO 178), and Charpy impact strength (ISO 179) were measured. In addition, the surface condition (surface smoothness) of this specimen was observed and evaluated. The criteria for the evaluation of surface condition were three scales, i.e., ○: good (the surface has no roughness and is smooth), Δ: a little bad (the surface has a little roughness), x: poor (the surface has remarkable roughness). These results are shown in [Table 1] given below.

<Formulation>unit: part(s) by mass
Maleated polypropylene resin 80
Glass fiber (see [Table 1] given below) 20
Tetrakis[methylene-3-(3',5'-di-tert-butyl-4'-hydroxyphenyl)propionate]methane 0.1
Bis(2,6-di-tert-butyl-4-methylphenyl)pentaerythritol diphosphite 0.2

TABLE 1

|  |  | Example | | Comparative Example | | | |
|---|---|---|---|---|---|---|---|
|  |  | 1-1 | 1-2 | 1-1 | 1-2*[1] | 1-3*[2] | 1-4 |
| Glass fiber |  | a | b | c | c | c | d |
| Test compound | Compound No. 1 | ○ | — | — | — | — | — |
|  | Compound No. 2 | — | ○ | — | — | — | — |
|  | Comparative compound-1*[3] | — | — | — | — | — | ○ |
| Results of measurement/ evaluation | Tensile strength (MPa) | 87.3 | 85.6 | 71.8 | 73.1 | 75.2 | 79.8 |
|  | Flexural strength (MPa) | 123 | 121 | 103 | 104 | 108 | 113 |
|  | Charpy impact strength (KJ/m²) | 19 | 19 | 15 | 15 | 16 | 17 |
|  | Surface condition | ○ | ○ | X | X | Δ | Δ |

*[1]0.01 Parts by mass of Compound No. 1 was blended into a maleated polypropylene resin composition.
*[2]0.05 Parts by mass of Compound No. 1 was blended into a maleated polypropylene resin composition.
*[3]Sodium-2,2'-methylenebis(4,6-di-t-butylphenyl)phosphate Example 2 and Comparative Example 2

A prepolymer was produced by reacting 166 parts by mass of polytetramethylene ether glycol (average molecular weight 2000), 15 parts by mass of 1,4-butanediol, and 69 parts by mass of isophorone diisocyanate in methyl ethyl ketone.

Then, 300 parts by mass of water, 5.0 parts by mass of an emulsifier (commercial name "Adekapluronic P-85", produced by ADEKA), 7.5 parts by mass of adipic acid dihydrazide, and 12.5 parts by mass of a test compound (see [Table 2] given below) were added, and were further reacted. Then, methyl ethyl ketone was removed by evaporation, thereby producing a glass fiber sizing agent contain an aqueous polyurethane resin as a main ingredient.

Glass fibers e to h being 13 μm in diameter and 3 mm in length were produced by a chopped strand method using the resulting glass fiber sizing agents. At this time, the amount of a sizing agent attached to glass fibers, expressed in residual solid content, was 1 part by mass based on 100 parts by mass of the glass fibers.

Glass fibers e and f are products obtained by using compounds No. 1 and No. 2, which are o-sulfobenzimide compounds, as test compounds, respectively. Glass fiber g is a product obtained by using no test compound, and glass fiber h is a product obtained by using comparative compound-1 as a test compound.

Hereafter, a glass fiber-reinforced crystalline resin composition (maleated polypropylene resin composition) was formulated in the same manner as Example 1, and specimens were prepared from the composition, followed by measurement of various types of strength and evaluation of surface condition. These results are shown in [Table 2] given below.

TABLE 2

|  |  | Example | | Comparative Example | | |
|---|---|---|---|---|---|---|
|  |  | 2-1 | 2-2 | 2-1 | 2-2*[1] | 2-3 |
| Glass fiber |  | e | f | g | g | h |
| Test compound | Compound No. 1 | ○ | — | — | — | — |
|  | Compound No. 2 | — | ○ | — | — | — |
|  | Comparative compound-1*[2] | — | — | — | — | ○ |
| Results of measurement/ evaluation | Tensile strength (MPa) | 86.0 | 85.3 | 70.7 | 72.1 | 78.5 |
|  | Flexural strength (MPa) | 122 | 120 | 102 | 104 | 111 |
|  | Charpy impact strength (KJ/m²) | 18 | 18 | 14 | 14 | 16 |
|  | Surface condition | ○ | ○ | X | X | Δ |

*[1]0.01 Parts by mass of Compound No. 1 was blended into a maleated polypropylene resin composition.
*[2]Sodium 2,2'-methylenebis(4,6-di-t-butylphenyl)phosphate Example 3 and Comparative Example 3

Specimens were prepared in the same manner as Example 1 except for using 70 parts by mass of a polyethylene terephthalate resin (MA-2103 produced by UNITIKA, IV=0.68) and 30 parts by mass of glass fibers (see [Table 3] given below) instead of 80 parts by mass of the maleated polypropylene resin and 20 parts by mass of the glass fibers, and then measurement of various types of strength and evaluation of surface condition were conducted. These results are shown in [Table 3] provided below.

TABLE 3

|  |  | Example | | Comparative Example | | |
|---|---|---|---|---|---|---|
|  |  | 3-1 | 3-2 | 3-1 | 3-2*[1] | 3-3 |
| Glass fiber |  | a | b | c | c | d |
| Test compound | Compound No. 1 | ○ | — | — | — | — |
|  | Compound No. 2 | — | ○ | — | — | — |
|  | Comparative compound-1*[2] | — | — | — | — | ○ |
| Results of measurement/ evaluation | Tensile strength (MPa) | 11.7 | 11.2 | 10.0 | 10.5 | 10.3 |
|  | Flexural strength (MPa) | 240 | 230 | 220 | 210 | 220 |

TABLE 3-continued

|  | Example | | Comparative Example | | |
|---|---|---|---|---|---|
|  | 3-1 | 3-2 | 3-1 | 3-2*[1] | 3-3 |
| Charpy impact strength (KJ/m$^2$) | 7.2 | 7.0 | 5.4 | 6.4 | 5.6 |
| Surface condition | ○ | ○ | X | Δ | Δ |

*[1] 0.01 Parts by mass of Compound No. 1 was blended into a polyethylene terephthalate resin composition.
*[2] Sodium 2,2'-methylenebis(4,6-di-t-butylphenyl)phosphate Examples and Comparative Examples described above clearly show the following.

When glass fibers treated with a sizing agent made of only an aqueous resin are used, the resulting glass fiber-reinforced crystalline resin composition is poor in surface properties and insufficient in strength. When glass fibers treated with a sizing agent in which an aromatic phosphate metal salt is included in an aqueous resin are used, the surface properties and the strength of a resulting glass fiber-reinforced crystalline resin composition are somewhat improved, but the improvement is still insufficient. In the event that an o-sulfobenzimide compound is incorporated directly into a glass fiber-reinforced crystalline resin composition, improvement in the strength or surface properties of the composition is still insufficient.

On the other hand, when glass fibers treated with a glass fiber sizing agent of the present invention prepared by including an o-sulfobenzimide compound into an aqueous resin are used, the resulting glass fiber-reinforced crystalline resin composition is found to have excellent strength and have been improved in surface properties.

The invention claimed is:

1. A glass fiber-reinforced crystalline resin composition comprising a crystalline resin and glass fibers,
   wherein the crystalline resin is a polyolefin resin, and
   the glass fibers have been treated with a glass fiber sizing agent comprising an aqueous polyurethane resin comprising at least one o-sulfobenzimide compound selected from the group consisting of:

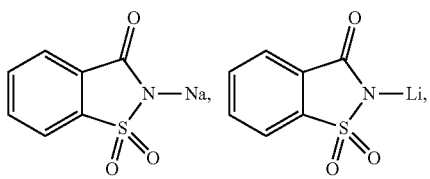

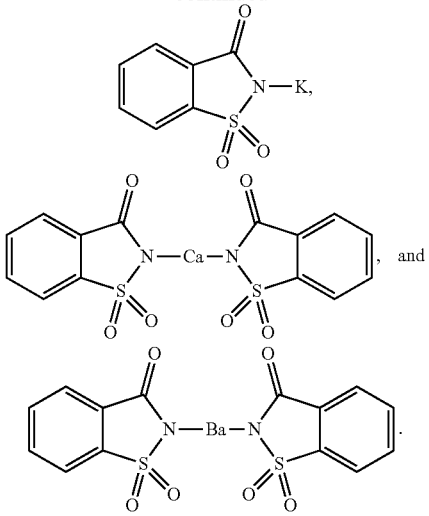

2. The glass fiber-reinforced crystalline resin composition according to claim 1, wherein the content of the o-sulfobenzimide compound is 1 to 10 parts by mass relative to 100 parts by mass of the aqueous polyurethane resin.

3. The glass fiber-reinforced crystalline resin composition according to claim 1, comprising 60-90% by mass of the crystalline resin and 5-40% by mass of the glass fibers treated with the glass fiber sizing agent.

4. The glass fiber-reinforced crystalline resin composition according to claim 1, wherein the crystalline resin comprises polypropylene resin.

5. The glass fiber-reinforced crystalline resin composition according to claim 1, wherein the at least one o-sulfobenzimide compound is

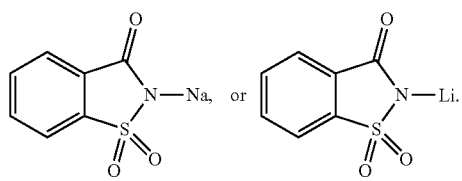

6. The glass fiber-reinforced crystalline resin composition according to claim 1, further comprising at least one antioxidant.

7. The glass fiber-reinforced crystalline resin composition according to claim 1, wherein the glass fibers treated with the glass fiber sizing agent contain 0.1 to 5 parts by mass of sizing agent, expressed in residual solid content, based on 100 parts by mass of the glass fibers.

8. The glass fiber-reinforced crystalline resin composition according to claim 1, wherein the glass fibers have a fiber length of 1-5 mm and a fiber diameter of 2-20 μm.

* * * * *